(12) United States Patent
Kleinschmidt, Jr. et al.

(10) Patent No.: US 7,536,504 B2
(45) Date of Patent: May 19, 2009

(54) ONLINE STORAGE MEDIUM TRANSFER RATE CHARACTERISTICS DETERMINATION

(75) Inventors: Robert Stevens Kleinschmidt, Jr., Sunland, CA (US); Craig Jensen, La Canada, CA (US); Sopurkh Khalsa, Los Angeles, CA (US); Andrew Staffer, Sylmar, CA (US); Gary Quan, Glendale, CA (US)

(73) Assignee: Diskeeper Corporation, Burbank, CA (US)

( * ) Notice: Subject to any disclaimer, the term of this patent is extended or adjusted under 35 U.S.C. 154(b) by 327 days.

(21) Appl. No.: 11/495,177

(22) Filed: Jul. 28, 2006

(65) Prior Publication Data
US 2008/0028142 A1   Jan. 31, 2008

(51) Int. Cl.
*G06F 13/00*   (2006.01)
(52) U.S. Cl. .................... 711/112; 711/167; 360/73.07
(58) Field of Classification Search ................ 711/112, 711/167; 360/73.07
See application file for complete search history.

(56) References Cited

U.S. PATENT DOCUMENTS

| | | | |
|---|---|---|---|
| 5,475,545 A | 12/1995 | Hampshire | |
| 5,854,941 A | 12/1998 | Ballard et al. | |
| 6,760,918 B2 * | 7/2004 | Rodriguez et al. | 725/134 |
| 6,848,019 B1 | 1/2005 | Mobley et al. | |
| 7,191,304 B1 * | 3/2007 | Cameron et al. | 711/202 |
| 2003/0005454 A1 * | 1/2003 | Rodriguez et al. | 725/89 |
| 2003/0121055 A1 * | 6/2003 | Kaminski et al. | 725/115 |
| 2005/0060356 A1 | 3/2005 | Saika | |

OTHER PUBLICATIONS

W.W. Hsu, A.J. Smith, "The performance impact of I/O optimizations and disk improvements", IBM J. Res. & Dev., Mar. 2004, vol. 48, No. 2, pp. 255-289.

T. Kakihara, A. Kanamaru, S. Nishino, A. Tobari, "Optimized Look-Ahead Extension on Sequential Access", IBM Technical Disclosure Bulletin, Nov. 1996, vol. 29, No. 11, pp. 61-62.

M. Kanamaru, N. Kitazaki, H. Mitome, "Head Hovering to Reduce Seek Time", IBM Technical Disclosure Bulletin, Jun. 1995, vol. 38, No. 06, p. 301-302.

\* cited by examiner

*Primary Examiner*—Reba I Elmore
(74) *Attorney, Agent, or Firm*—Hickman Palermo Truong & Becker LLP

(57) ABSTRACT

A method for determining storage medium transfer rate characteristics. A host computer system issues a sequence of read commands to a storage medium to determine an accurate mapping of differences in transfer rate characteristics. For example, the host issues a sequence of relatively large reads to the storage medium at successively higher logical cluster numbers (LCNs). The host waits for each read command to complete before issuing the next read command and tracks a time interval that is representative of the time between completions of read commands.

42 Claims, 5 Drawing Sheets

-- Prior Art --

ONLINE STORAGE MEDIUM TRANSFER RATE CHARACTERISTICS DETERMINATION

FIELD OF THE INVENTION

The present invention relates to accessing data on a storage medium such as a hard disk drive. In particular, the present invention relates to determining the transfer rate characteristics of a storage medium.

BACKGROUND

For many different types of storage media, the speed with which data may be retrieved varies depending upon where the data is stored on the storage medium. For example, with hard disk drives the speed of retrievability varies based on physical factors that are discussed below. Examples of other storage media for which speed of retrievability differs based on where the data is stored include Compact Disc (CD), or Digital Versatile Disc (DVD) media, hybrid storage systems using a mixture of solid state storage and disk storage and Redundant Array of Independent Disks (RAID) systems composed of multiple disks.

A modern hard disk drive contains one or more round disks, or "platters" that rotate around a spindle at a high speed (typically in the range of 5400 to 15,000 revolutions per minute). Each side of each platter is coated with a material that can be magnetized in regions to record data on the disk. The data is written, and read back, using an electromagnetic device called a "head," which travels on a cushion of air very close to the surface of the platter. One or both sides of a given platter may be used to record data. If both sides are used the platter will have two heads associated with it (one on each side). If only one side is used there will only be one head per platter.

If the hard drive has multiple platters, the hard drive will have one head for each platter surface attached to the fingers of a comb type device such that all heads can be moved in and out as a unit across the surfaces of the platters. A disk controller can move the heads to any desired position on the disk and then hold them there so a circular ring of the disk flies under each head as the disk spins. This ring is called a "track." The set of all tracks that move under all the heads, with the head assembly held in one place, is called a "cylinder." The circumference of the tracks is increasingly larger moving from the innermost track to the outmost track. Data is written around a track in fixed size chunks, called "sectors."

To access data at a particular region of a given platter, the heads must be moved to the correct location on the disk and the data must be transferred to or from the hard drive. For example, when reading data from a disk, the total wait for the requested data to arrive in memory includes the time taken to move the heads to the correct cylinder, the time taken for the disk to rotate such that the data is under the head, and the time taken to read the data from the disk and transfer it to the memory of the computer. Most disk drives employ buffering to improve performance. For example, the disk drive reads sectors and buffers the data in advance of an actual command to read those sectors in anticipation that a command will be received to read those sectors.

As used throughout this description, the term "access time" means the time from when a command to access the hard drive is received by the hard drive until the hard drive is ready to access (read or write) the data from the disk. This access time is primarily affected by a "seek time" and a "rotational delay". As used throughout this description, the term "seek time" means the time taken to move the heads from their current location to the correct cylinder. For example, the heads must be moved radially inward or outward from their present location to the desired cylinder. Furthermore, the disk must rotate such that the head will be over the correct sector. As used throughout this description, the term "rotational delay" means the time for the desired sector to rotate to the head once the head is at the correct cylinder. The access time may also be affected by other factors such as a "command overhead time" and "head settle time". The command overhead time is the time between when the disk drive receives the command to when the disk drive starts to move the head. The head settle time is the time its takes the head to stabilize after being moved to allow data access to or from the platter. The command overhead and head settle time are typically much smaller than the seek time and rotational delay with modern disk drives.

Once the hard drive has positioned the head over the correct location on the platter to access the data, a further amount of time is required for the hard drive to transfer data to or from the platter. For example, a hard drive may have an internal controller that oversees the transfer of data to or from the platter by sending signals to or receiving signals from the head. As used throughout this description, the term "internal disk transfer rate" means the rate at which the hard drive can read data from or write data to the platter. The internal disk transfer rate may be affected by many factors. An example of an internal factor is the rate that the data is read or written from/to the disk surface due to the rotational speed of the disk and amount of data per track. As used throughout this description, the term "media transfer rate" means the rate at which the hard drive is able to transfer data to or from a particular track. The media transfer rata is affected by the number of bits per track and the rotational speed of the platter.

The platters of a hard disk rotate at a constant rate. Because of this, it takes the same time for a complete inner track or a complete outer track to move under the disk head. Since an outer track contains more data than an inner track, it will have a higher transfer rate. Typically, manufacturers quote internal disk transfer rates (the rate that data can be written to or read from the disk) as a range of values. For example, a range might be a minimum of 43 Mbytes per second and a maximum of 78 Mbytes per second. However, the actual transfer rate at any particular place on the disk may be anywhere between the two extremes.

There are other factors that affect the internal disk transfer rate. Many hard drives store data on all of the tracks in a cylinder before moving the heads to the next cylinder. This avoids, or at least delays, the need to move the heads from one track to the next. However, the drive must switch from a head associated with one platter to a head associated with another platter. Switching between heads within a cylinder still requires a certain amount of time, which is referred to as a "head switch time." As used throughout this description, the term "head switch time" means the time for the hard drive to switch from one head being used to access one of its platter surfaces to another head being ready to access another platter surface.

Still another factor that may affect the internal disk transfer rate is the "cylinder switch time", which is the time taken to move the heads from one cylinder to an adjacent cylinder. As used throughout this description, the term "cylinder switch time" means the time for the heads to move from a first cylinder to an adjacent cylinder when changing from accessing data associated with the first cylinder to the adjacent cylinder.

Thus, the internal disk transfer rate can be influenced by the media transfer rate, the head switch time, the head cylinder switch time, as well as other factors not specifically enumerated herein. As a practical matter, access time is also influenced by re-vectoring of data to a different sector of the disk due to bad sectors. As used throughout this description, the term "internal disk transfer rate" means the rate at which a hard disk drive can transfer data between the platters and the hard disk's controller.

Another type of transfer rate is referred to herein as an "external transfer rate." As used throughout this description, the term "external transfer rate" means the rate at which data can be moved between the hard disk and an external device. An example of a factor that affects the external transfer rate is the speed of the connection between the disk and the device to which it exchanges data (e.g., host computer).

One technique to read or write data faster to a hard disk drive is the attempt to improve the access time by minimizing the movement of the head. For example, one technique might be to store frequently accessed data in the middle portion of the disk and infrequently accessed data in the inner and/or outer regions of the disk. The intent of such a technique is to minimize the movement of the head from one access to the next. That is, it is assumed that most accesses will be to the middle of the disk such that the head does not need to travel a substantial distance towards the inside or, alternatively, towards the outside of the disk.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
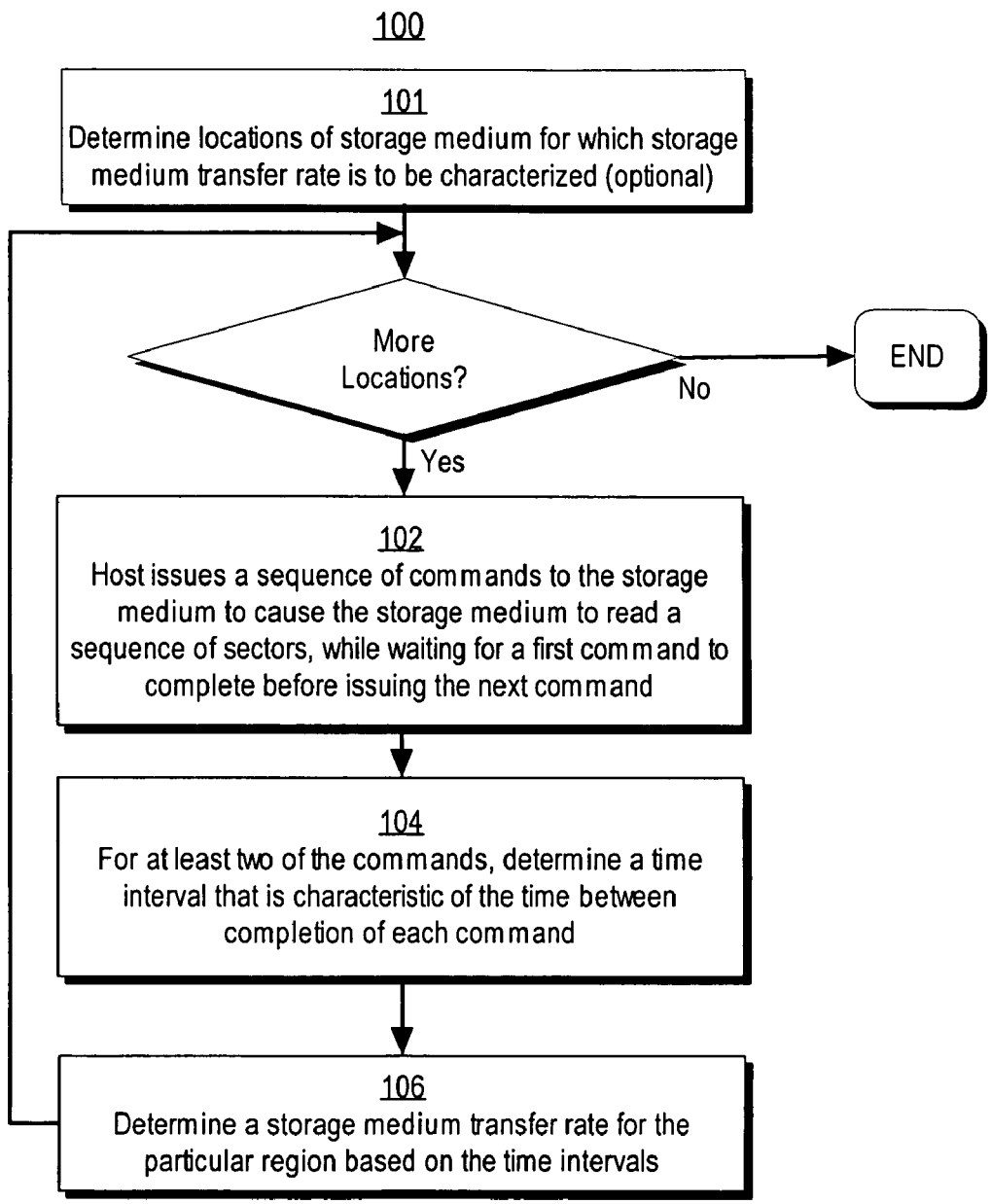
FIG. 1 is a flowchart illustrating steps of a process of determining storage medium transfer rate characteristics, in accordance with an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

For some storage mediums, the rate of data retrievability may be significantly different depending upon what location is being read. As used herein, the term "rate of data retrievability" refers to the rate at which data can be read from a storage medium. For a hard disk drive a factor that affects the rate of retrievability is the disk transfer rate, which is the rate at which the drive head can read data from a surface of a platter. For example, the transfer rate of a hard disk drive may be significantly different in 20 or more regions across the hard disk drive. The rate of retrievability may vary based on storage location for other storage media such as, but not limited to, CD or DVD media, hybrid storage systems using a mixture of solid state storage and disk storage, and RAID systems composed of multiple disks.

A method is described herein for determining transfer rate characteristics of a storage medium. The transfer rate characteristics include values that represent transfer rates for particular regions, in one embodiment. In another embodiment, the transfer rate characteristics are a ranking of the relative transfer rates of different regions. For example, region A can be characterized as having a faster transfer rate than region B, even if the actual transfer rates are not determined. The storage medium is a hard disk drive, in one embodiment. However, the storage medium can be a device other than a hard drive.

A host computer determines storage medium transfer rates, in accordance with embodiments of the present invention. In accordance with one aspect of the present invention, the host computer system issues a sequence of read commands to a storage medium to determine an accurate mapping of differences in transfer rate characteristics. For example, the host issues a sequence of relatively large reads to the storage medium at successively higher logical cluster numbers (LCNs). The host waits for each read command to complete before issuing the next read command and tracks a time interval that is representative of the time between completions of read commands. Various factors that might interfere with an accurate determination of transfer rate characteristics are eliminated by the timing of the reads, size of reads, and location of reads. For example, unpredictable rotational delays and access times, which would otherwise interfere with an accurate measurement, do not prevent an accurate measurement. Moreover, transfer rate characteristics of the entire storage medium, or at least essentially the entire storage medium, can be determined using a relatively few reads.

In accordance with another aspect of the present invention, in order to determine storage medium transfer rate characteristics, a host computer issues a sequence of commands to the storage medium in such a way as to determine where there is a discontinuity in read time characteristics. The discontinuities reveal track boundaries on the storage medium from which storage medium transfer rate characteristics can be determined. In one embodiment, the host computer causes the storage medium to read in a reverse direction to detect the discontinuities. For example, the host causes a disk drive to read clusters at successively lower LCNs. This causes the platters of the disk drive to complete approximately, though not exactly one revolution between each read command. By tracking the time it takes for each read to complete, the host has a measure that is representative of how far the platter revolved between each read. Due to the way in which data is typically stored on a hard disk drive, the amount that the platter revolves in order for the head to read the next lowest cluster when the head crosses a track boundary is less than when reading the next lowest cluster on the same track. More particularly, data is typically stored with what is referred to as a "cylinder skew" between two cylinders. It is this cylinder skew that is detected to locate the track boundary.

Therefore, track boundaries are detected by this discontinuity in read time characteristics. Once track boundaries are known, the amount of data per track can be determined, based on the read commands that were issued. The amount of data per track for different tracks can be used to determine transfer rate characteristic. The transfer rate characteristic of a particular region can be a value that is based on the rate at which data is transferred from a particular region. However, the transfer rate characteristics of a particular region can be based on its ranking with different regions. For example, knowing that track "A" has more data than track "B" allows track "A" to be ranked higher in terms of transfer rate than track "B".

Process Flow in Accordance with First Embodiment

FIG. 1 is a flowchart illustrating steps of a process 100 of determining storage medium transfer rate characteristics for a particular location on a storage medium, in accordance with a first embodiment of the present invention. Process 100 can be repeated for additional locations to determine how the storage medium transfer rate varies in different locations. For example, it is not necessary for the transfer rate characteristics to be determined for all sectors or LCNs of the storage medium. As an example, for some hard disk drives the storage medium transfer rate may be significantly different in 20 or more regions across the disk. In one embodiment, the storage medium transfer rate is characterized at about 60 different locations of the hard disk. However, the storage medium transfer rate can be characterized at more or fewer locations.

In step 101, locations are determined for which a storage medium transfer rate is to be characterized. Determining the locations is an optional step. The locations can be based on the total storage capacity of the storage medium. A given location may be any size. For example, a particular location can be defined to be a group of hard drive sectors or clusters. The actual transfer rate is not necessarily the same for all points within a particular location. Thus, the transfer rate characteristic is representative for the location, but does not necessarily represent a transfer rate for any particular point in the location. Steps 102-106, which are used to determine a storage medium transfer rate characteristic for a particular location, are repeated until a transfer rate characteristic is determined for all desired locations.

In step 102, a host application issues a sequence of commands to the storage medium to cause the storage medium to read one or more units per read. A unit could be a sector, a cluster, or other unit of data that the storage medium allows for reads. The host application waits for each read command to complete prior to issuing the next read command. The reads cause the storage medium to read in a forward direction, in one embodiment. The size of the reads may be multiple clusters. For example, the first read may be from LCN(y) to LCN(y+n−1), the second read from LCN(y+n) to LCN(y+2n−1), where "y" is the beginning of the location for which the storage medium transfer rate is being characterized by this sequence of reads, and "n" is the size of a read as expressed in clusters. Process 200 of FIG. 2 describes determining storage medium transfer rate characteristics involving causing the storage medium to read forward, in accordance with an embodiment of the present invention.

The host application issues read commands that cause the storage medium to read in a reverse direction, in one embodiment. For example, a cluster at LCN(n) is read, followed by a cluster at LCN(n−1), etc. Process 300 of FIG. 3 describes determining a storage medium transfer rate characteristics involving causing the storage medium to read in reverse, in accordance with an embodiment of the present invention.

In step 104, a time interval is determined that is characteristic of the time between completions of successive read commands, for at least two of the read commands. This time interval is not the storage medium transfer rate itself. That is, this time interval includes the time it takes the storage medium to transfer the data off from the storage medium, but also includes other time such as the time between when the host issues the read command and the storage medium begins to transfer data from the storage medium. There will also be a time gap between when the storage medium begins to transfer data from the storage medium and the host application receives the indication that the read completed. However, analyzing the one or more of the time intervals can be used to determine a storage medium transfer rate that is characteristic of the location.

In step 106, a storage medium transfer rate characteristic for the particular location is determined based on the time intervals. A technique to determine a storage medium transfer rate characteristics when the reads are preformed in a forward direction is discussed in process 200 of FIG. 2. A technique to determine a storage medium transfer rate characteristics when the reads are preformed in a forward direction is discussed in process 300 of FIG. 3. Process 100 then repeats to determine a storage medium transfer rate characteristic for another location.

Process Flow in Accordance with Second Embodiment

Figure 2:
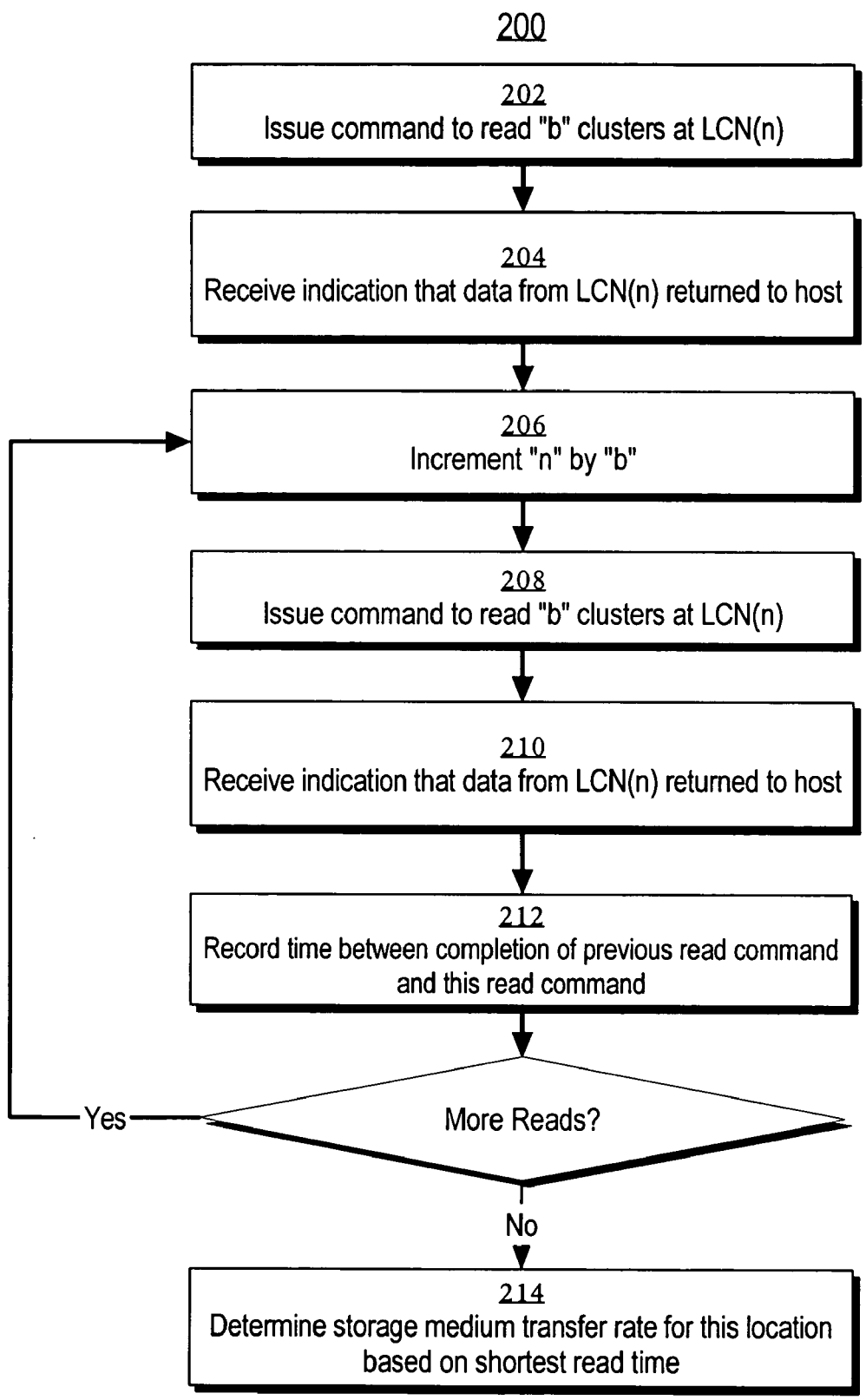
FIG. 2 is a flowchart illustrating steps of a process of determining storage medium transfer rate characteristics, in accordance with a second embodiment of the present invention.

FIG. 2 is a flowchart illustrating steps of a process 200 of determining storage medium transfer rate characteristics of a storage medium, in accordance with a second embodiment of the present invention. In step 202, a host application issues a command to read "b" clusters at LCN(n). In step 204, an indication is received that data from LCN(n) is returned to host application. The host application records the time the indication is received, although not necessarily immediately when the indication is received. The time is used to determine a close approximation of the time interval between the completion of this read and a future read.

In step 206, "n", the cluster at which to start the read, is incremented by "b". In step 208, the host application issues a command to the storage medium to read "b" clusters at the new LCN(n).

In step 210, an indication is received that the sectors have been read. For example, data associated with the read is transferred to the host computer. The timer is stopped at substantially the time as when the indication is received that the sectors have been read.

In step 212, a value is recorded representing the time interval between receiving an indication that the previous read completed and receiving an indication that this read completed. If there are more read commands to be issued for this location, then process 200 returns to step 206 to issue the next read command. Otherwise, control goes to step 214 to determine the storage medium transfer rate characteristic for this location. The storage medium transfer rate characteristic is based on the shortest recorded time, in one embodiment.

Process Flow in Accordance with Third Embodiment

Figure 3:
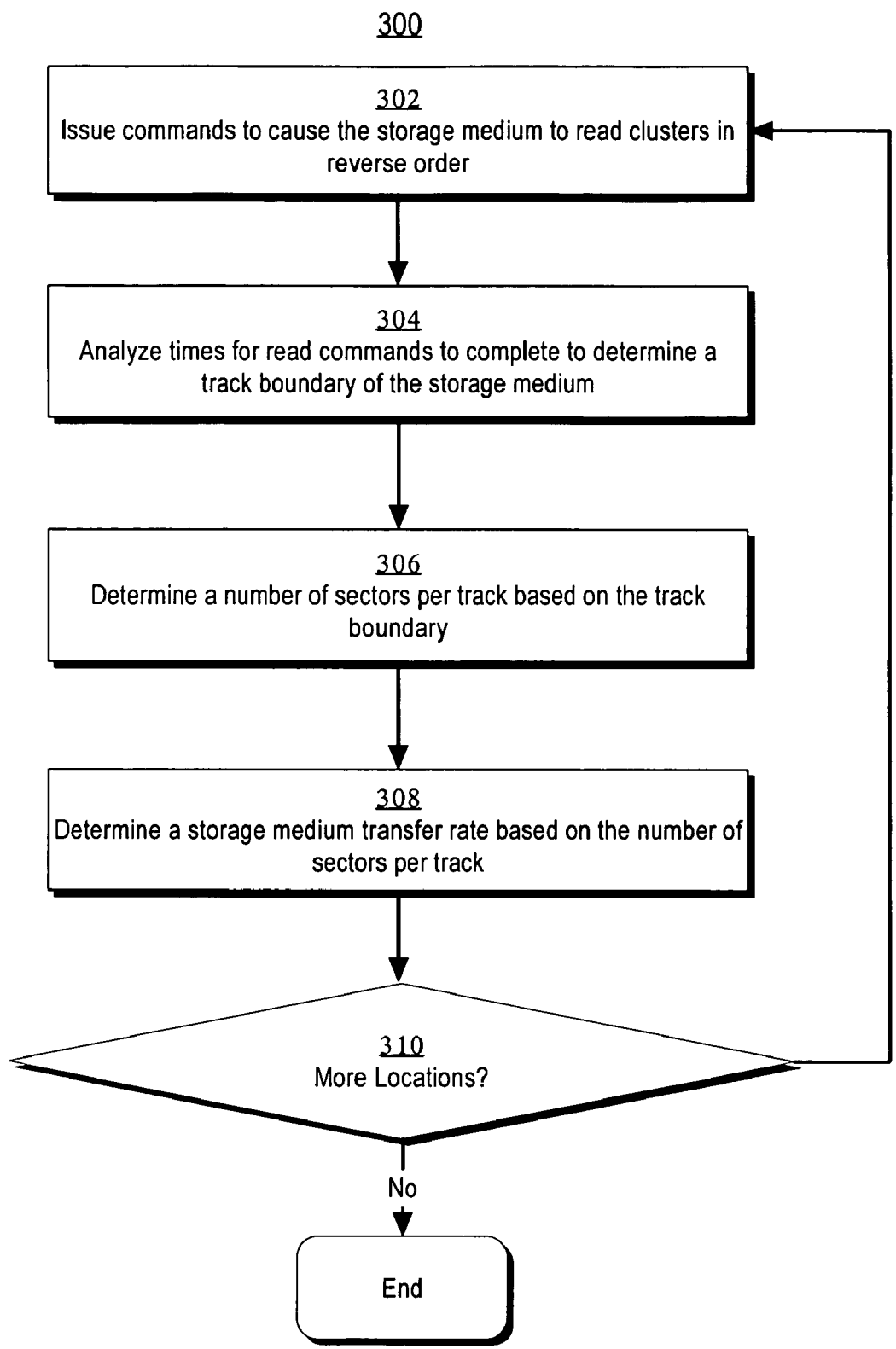
FIG. 3 is a flowchart illustrating steps of a process of determining storage medium transfer rate characteristics by causing a storage medium to read in a reverse direction, in accordance with a third embodiment of the present invention.

FIG. 3 is a flowchart illustrating steps of a process 300 of determining storage medium transfer rate characteristics of a storage medium, in accordance with a third embodiment of the present invention. In step 302, commands are issued to the storage medium to cause the storage medium to read units of data in reverse direction. For example, commands to read LCN(n), LCN(n−1), LCN(n−2), etc. are issued. The reads can be for more than one logical cluster. The time for each read to complete is tracked. For example, the host application tracks the amount of time between when the host application issued the read command and when the host application received an indication that the read completed.

In step 304, the read times are analyzed to determine at least one track boundary of the storage medium. Analyses of the read times may show that most read times are substantially the same. However, one or more read times may be substantially different from the rest. Typically, this read time will be substantially less than the others. The read with the substantially different time corresponds to a track boundary.

Figure 4:
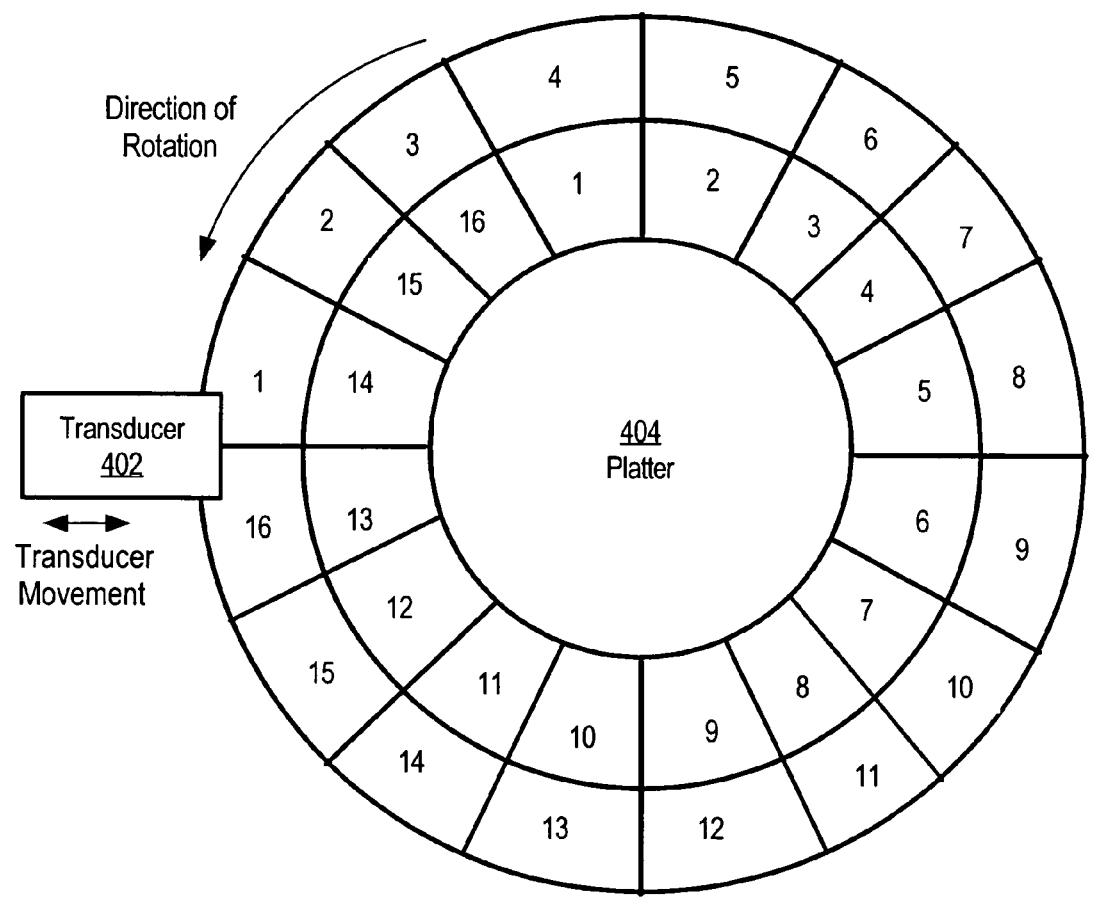
FIG. 4 is a diagram illustrating principles of reading a storage medium to determine transfer rate characteristics, in accordance with a third embodiment of the present invention.

A reason for the lower read time may be explained with respect to the example storage medium depicted in FIG. 4. Two tracks are depicted with 16 sectors per track. If the data were to be read in a forward direction, the transducer 402 reads, in order, sectors 1-16 on the outer track and then sectors 1-16 on the inner track. It takes a small amount of time for the transducer 402 to move inward to change from reading the outer track to the inner track. During this delay, the platter 404 rotates a portion of a revolution. In this example, there is a three sector offset between the outer track and the inner track to give the transducer 402 time to move to the inner track and settle to begin reading sector 1 on the inner track after reading sector 16 on the outer track.

When reading one sector at a time in the reverse direction, in accordance with the present embodiment, the platter 404 rotates nearly one revolution in order for the transducer 402 to be able to read the "previous" sector. For example, to move the transducer 402 from reading sector two of any track to reading sector one requires nearly a full revolution of the platter 404. However, to move the transducer 402 from reading sector one on the inner track to reading sector 16 on the outer track requires three sectors less than a full rotation of the platter 404. Thus, the read time is significantly lower for this read.

In step 306, the amount of data per track is determined based on track boundaries. In step 308, a storage medium transfer rate characteristic is determined based on the amount of data per track. The amount of data per track is determined based on the number of sectors, clusters, or other unit of data.

Hardware Overview

Figure 5:
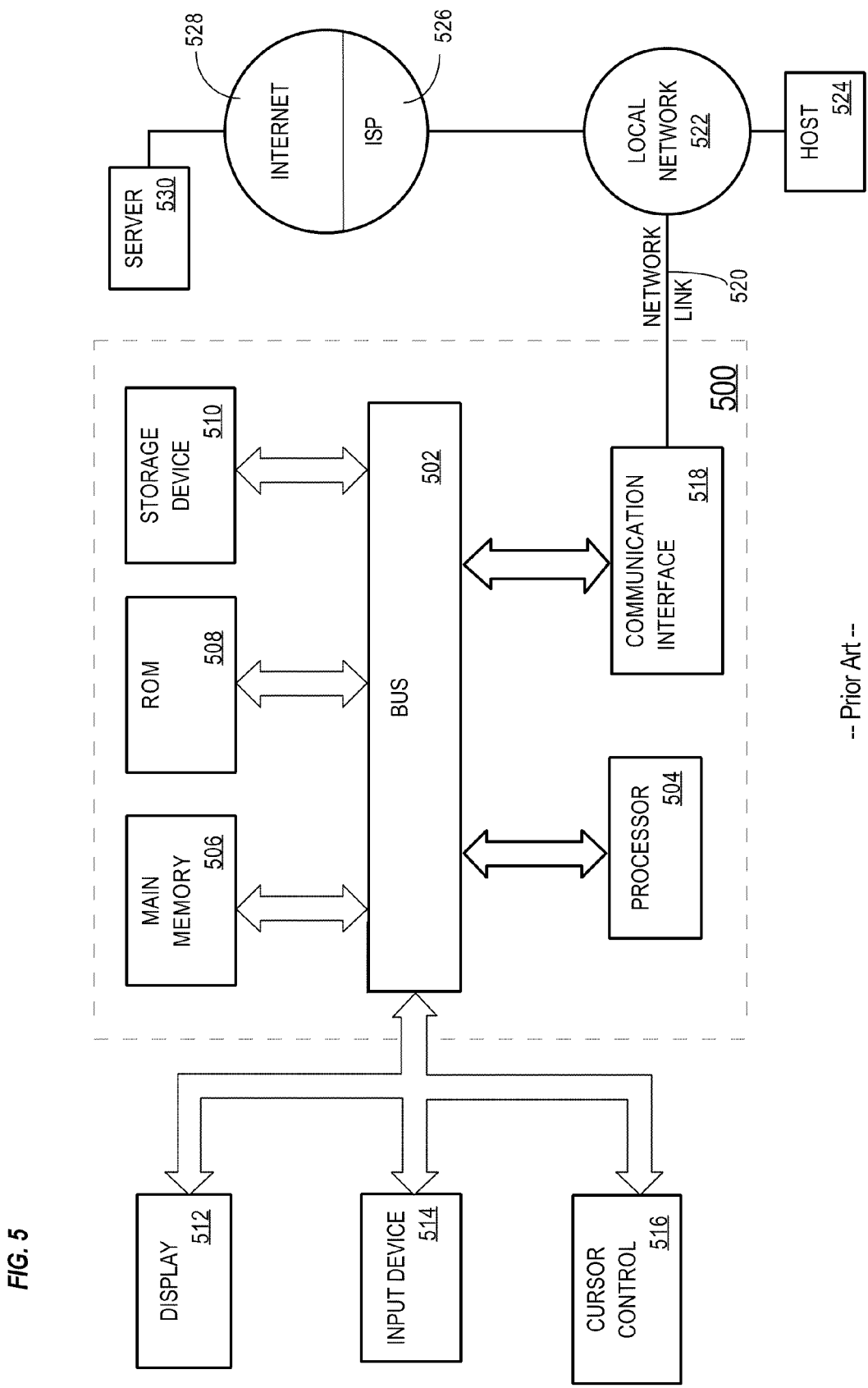
FIG. 5 is a block diagram that illustrates a computer system upon which an embodiment of the invention may be implemented.

FIG. 5 is a block diagram that illustrates a computer system 500 upon which an embodiment of the invention may be implemented. For example steps of processes 100, 200, and 300 may be encoded as instructions, which can be executed on one or more processors. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions. The computer system 500 can have any number of processors 504. For example, computer system 500 is a multi-processor system, in one embodiment. The processor 504 can have any number of cores. In one embodiment, the processor 504 is a multi-core processor 504. Computer system 500 can be used in a hyper threaded machine.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infrared data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a Compact Disc Read-Only Memory (CD-ROM), any other optical medium, punch-cards, papertape, any other physical medium with patterns of holes, a Random-Access Memory (RAM), a Programmable Read-Only Memory (PROM), and Erasable Programmable Read-Only Memory (EPROM), a Flash-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising computer-executed steps of:
    determining a storage medium transfer rate characteristic for a plurality of regions of a storage medium by performing the following for each of the regions:
        issuing successive commands to the storage medium to cause the storage medium to read one or more sectors in a particular region of the storage medium, wherein successive ones of the commands are issued in response to receiving an indication that the previous command has completed;
        for at least two of the commands, determining a value that is based on the time interval between receiving an indication that the command prior to a particular command has completed and receiving an indication that the particular command has completed; and
        determining a storage medium transfer rate characteristic for the particular region based on the values determined for the at least two commands.

2. The method of claim 1, further comprising defeating a read ahead cache on the storage medium prior to the step of issuing successive commands to the storage medium.

3. The method of claim 2, wherein the step of defeating the read ahead cache comprises issuing a command to the storage medium to cause the storage medium to fill the read ahead cache with data other than data to be read by the commands that cause the storage medium to read one or more sectors in the particular region.

4. A computer-readable storage medium storing one or more sequences of instructions which, when executed by one or more processors, causes the one or more processors to perform the method recited in claim 3.

5. A computer-readable storage medium storing one or more sequences of instructions which, when executed by one or more processors, causes the one or more processors to perform the method recited in claim 2.

6. The method of claim 1, wherein the successive ones of the commands cause the storage medium to read in a forward direction.

7. The method of claim 6, wherein the amount of data to be read from the storage medium for each command of the successive commands is greater than the size of a read ahead cache on the storage medium.

8. A computer-readable storage medium storing one or more sequences of instructions which, when executed by one or more processors, causes the one or more processors to perform the method recited in claim 7.

9. The method of claim 6, wherein the amount of data to be read from the storage medium for a particular command of the successive commands is greater than the amount of data associated with the particular command that is transferred by the storage medium into a read ahead cache prior to the storage medium receiving the particular command.

10. A computer-readable storage medium storing one or more sequences of instructions which, when executed by one or more processors, causes the one or more processors to perform the method recited in claim 9.

11. The method of claim 6, wherein determining a storage medium transfer rate characteristic for the particular region is further based on an amount of data read for the particular command of the successive commands having the shortest time interval.

12. A computer-readable storage medium storing one or more sequences of instructions which, when executed by one or more processors, causes the one or more processors to perform the method recited in claim 11.

13. A computer-readable storage medium storing one or more sequences of instructions which, when executed by one or more processors, causes the one or more processors to perform the method recited in claim 6.

14. The method of claim 1, wherein the successive commands cause the storage medium to read in a reverse direction.

15. The method of claim 14, further comprising analyzing the values determined for at least two commands to determine a track boundary of the storage medium.

16. The method of claim 15, wherein analyzing the values comprises:
  comparing the values determined for the at least two commands; and
  detecting one of the values that is significantly different from the other values.

17. The method of claim 16, wherein detecting one of the values which is significantly different from the others comprises detecting one of the values which is significantly lower from the other values.

18. A computer-readable storage medium storing one or more sequences of instructions which, when executed by one or more processors, causes the one or more processors to perform the method recited in claim 17.

19. A computer-readable storage medium storing one or more sequences of instructions which, when executed by one or more processors, causes the one or more processors to perform the method recited in claim 16.

20. A computer-readable storage medium storing one or more sequences of instructions which, when executed by one or more processors, causes the one or more processors to perform the method recited in claim 14.

21. The method of claim 15, wherein determining a storage medium transfer rate characteristic for the particular region is further based on the track boundary.

22. A computer-readable storage medium storing one or more sequences of instructions which, when executed by one or more processors, causes the one or more processors to perform the method recited in claim 21.

23. A computer-readable storage medium storing one or more sequences of instructions which, when executed by one or more processors, causes the one or more processors to perform the method recited in claim 15.

24. The method of claim 1, wherein receiving an indication that the previous command has completed comprises receiving an indication that the storage medium has returned data for the previous command.

25. A computer-readable storage medium storing one or more sequences of instructions which, when executed by one or more processors, causes the one or more processors to perform the method recited in claim 24.

26. The method of claim 1, wherein:
  receiving an indication that the particular command has completed comprises receiving an indication that the storage medium has returned data for the particular command.

27. A computer-readable storage medium storing one or more sequences of instructions which, when executed by one or more processors, causes the one or more processors to perform the method recited in claim 26.

28. A computer-readable storage medium storing one or more sequences of instructions which, when executed by one or more processors, causes the one or more processors to perform the method recited in claim 1.

29. A method comprising computer-executed steps of:
  a) issuing a plurality of commands to cause the storage medium to read a plurality of clusters in reverse order;
  b) analyzing read times of the commands to determine at least one track boundary of the storage medium;
  c) determining an amount of data per track based on the at least one track boundary; and
  d) determining a storage medium transfer rate characteristic for a track based on the amount of data per track.

30. The method of claim 29, further comprising repeating steps a)-d) to determine a storage medium transfer rate characteristic for other tracks of the storage medium.

31. A computer-readable storage medium storing one or more sequences of instructions which, when executed by one or more processors, causes the one or more processors to perform the method recited in claim 30.

32. The method of claim 29, wherein determining a storage medium transfer rate characteristic is further based on a rotation time of a disk of the storage medium.

33. A computer-readable storage medium storing one or more sequences of instructions which, when executed by one or more processors, causes the one or more processors to perform the method recited in claim 32.

34. The method of claim 29, wherein analyzing read times of the commands to determine a track boundary of the storage medium comprises:
  determining an amount of time for each of the commands to complete; and
  detecting one of the times that is significantly different from the others.

35. A computer-readable storage medium storing one or more sequences of instructions which, when executed by one or more processors, causes the one or more processors to perform the method recited in claim 34.

36. The method of claim 29, wherein the step of determining an amount of data per track based on the track boundary is based on an amount of data read between two track boundaries.

37. A computer-readable storage medium storing one or more sequences of instructions which, when executed by one or more processors, causes the one or more processors to perform the method recited in claim 36.

38. The method of claim 29, further comprising defeating a read ahead cache on the storage medium.

39. The method of claim 38, further comprising issuing a command to the storage medium to cause the storage medium to fill a read ahead cache on the storage medium with data other than data to be read by the plurality of commands.

40. A computer-readable storage medium storing one or more sequences of instructions which, when executed by one or more processors, causes the one or more processors to perform the method recited in claim 39.

41. A computer-readable storage medium storing one or more sequences of instructions which, when executed by one or more processors, causes the one or more processors to perform the method recited in claim 38.

42. A computer-readable storage medium storing one or more sequences of instructions which, when executed by one or more processors, causes the one or more processors to perform the method recited in claim 29.

* * * * *